Inventors
R. J. Froggatt
N. D. Robinson
By Mascock Downing & Seebold
Attys.

Nov. 1, 1960 R. J. FROGGATT ET AL 2,958,855

DATA STORAGE DEVICES

Filed April 29, 1958 2 Sheets-Sheet 2

Inventors
R. J. Froggatt
N. D. Robinson
By Glascock Downing & Seebold
Attys.

United States Patent Office 2,958,855

Patented Nov. 1, 1960

2,958,855

DATA STORAGE DEVICES

Robert Justin Froggatt, Norwood Green, Southall, and Nigel David Robinson, Hillingdon, England, assignors to Electric & Musical Industries Limited, Hayes, England, a company of Great Britain Filed Apr. 29, 1958, Ser. No. 731,734

Claims priority, application Great Britain Apr. 30, 1957

5 Claims. (Cl. 340—174)

Figure 1A:
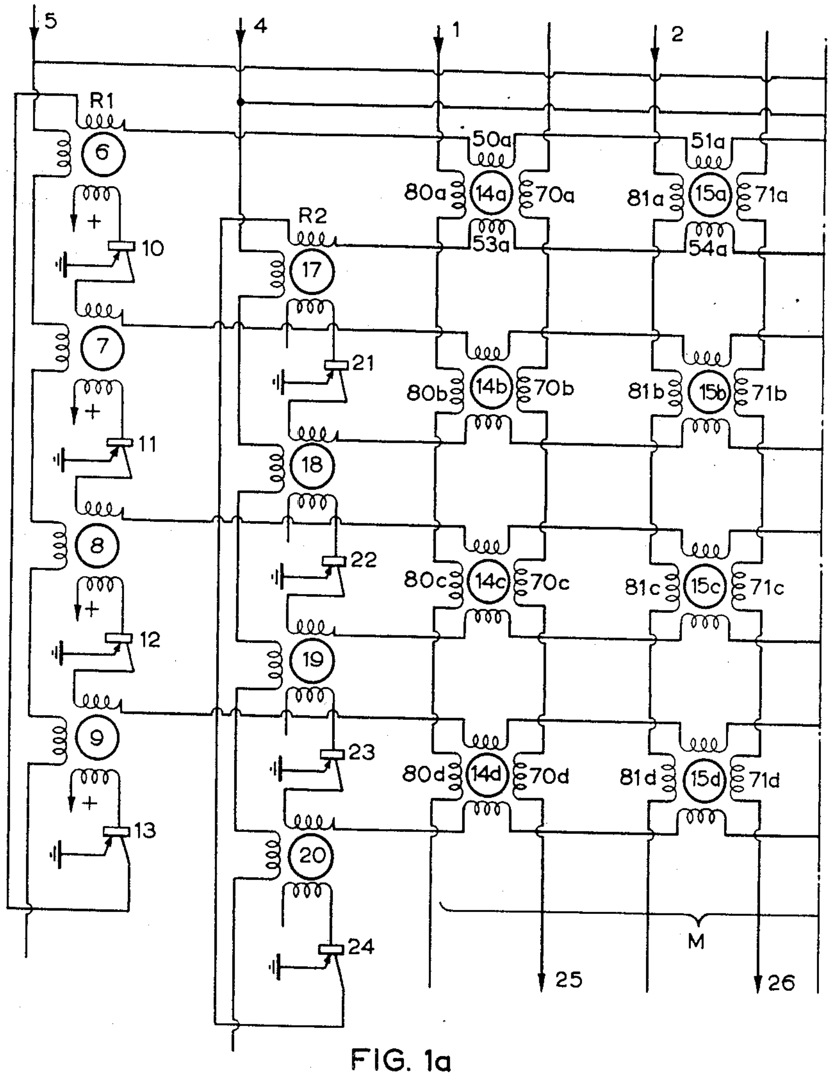
Figure 1B:
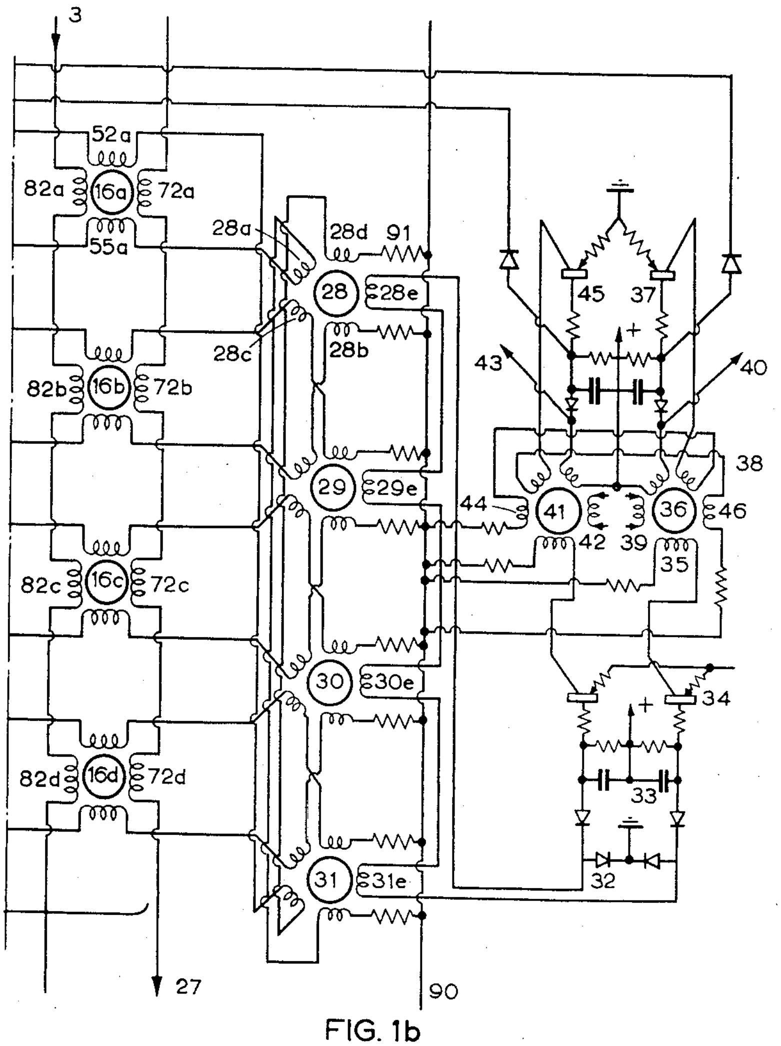

This invention relates to data storage devices such as are used in information handling apparatus.

In information handling apparatus, especially in electronic digital computers, capable of high operating speeds it is usual to provide what is termed a "buffer" store between the input and output devices to the apparatus which are relatively slow in operation and the apparatus itself, because of the considerable discrepancy in operating speeds.

Such "buffer" stores are usually provided with serial access for both reading and writing.

The object of the present invention is to provide a novel and improved "buffer" store for use with information handling apparatus.

A further object of the present invention is to provide a data storage device comprising a store having a plurality of storage locations, means for recording and/or reproducing information in said store in different locations and means responsive to said recording and/or reproducing means for indicating an extreme condition of the store.

In order that the invention may be understood and readily carried into effect, it will now be described with reference to the accompanying drawing which illustrates an embodiment of the present invention in which the components are represented by their conventional symbols and the interconnections are as shown.

The input information may be obtained from a tape reader or other input device or the computer and is applied to the buffer store, in the form of matrix M of magnetic cores, at input terminals 1, 2 and 3 in parallel binary digital form. A digit of value 1 in an item of input information is applied at the appropriate input terminal 1, 2 or 3 in the form of pulse which produces by way of the read in windings 80, 81 or 82 as the case may be, a half strength drive on the cores in the respective column of a storage matrix M, tending to change all the cores in the column from state "0" to state "1." The read in windings on the cores in the various rows of the matrix M are distinguished by suffixes *a*, *b*, *c* and *d*. If, when a given item of information is applied to the terminals 1, 2 and 3, "write" pulses are simultaneously applied at 5 to the shifting register R1 comprising the cores 6, 7, 8 and 9 and the transistors 10, 11, 12 and 13, the applied information is recorded in one row of the matrix M. Only three input terminals are shown but in practice the number would usually be much larger. The shifting register has one bit only stored in it and this is shifted around the register by successive "write" pulses at 5 in known manner. The collector current of the transistor 13 enables input information to be written into the top row of the storage cores 14*a*, 15*a*, and 16*a*. Similarly the output current of the other transistors round the register loop enable input information to be written into the other rows of the storage matrix.

In a similar way "read" pulses applied at 4 step a single bit stored in the shifting register R2 comprising cores 17, 18, 19 and 20 and transistors 21, 22, 23, 24 around the register loop, causing reproduction to occur in parallel from the appropriate row of core of the information stored therein, along the lines 25, 26, 27 to the computer or output device.

The shift register R2 is of the same construction as R1. The collector current of transistor 24 produces a full strength drive on windings 53*a*, 54*a* and 55*a* applied to the cores in row 1, sufficient to drive a core from state "1" to state "0" thereby producing a corresponding output pulse in the respective output winding 70*a*, 71*a* and 72*a* and so on for the other rows.

Magnetic cores 28, 29, 30 and 31 form part of means for indicating an extreme (full or empty) condition of the matrix M, and each of the cores 28 to 31 is arranged so that it tends to be set to a first remanent state by the "read" current of the storage row immediately below and the "write" current of the storage row immediately above, and it tends to be set to a second remanent state by the "read" current of the storage row immediately above and the "write" current of the storage row immediately below each core. For example the core 28 has a full strength drive winding 28*a* and 28*b* in the collector circuits of the transistors 24 and 21 and full strength drive windings 28*c* and 28*d* of opposite polarity in the collector circuit of the transistors 10 and 13, and so for the other transistors as shown in drawings. Thus the core 28 is set to a first remanent state by the output current of transistors 13 and 21 and to a second remanent state by the output current of transistors 10 and 24. The collector circuits of all the transistors so far referred to are completed to a negative voltage supply line 90 by current limiting resistors such as resistor 91.

Because of these connections to the cores, as successive words are written into the storage matrix, one by one the indicator cores are set from the first remanent state to the second, and an output pulse is obtained across the serially connected output windings 28*e* to 31*e* of the indicator cores at 32. The tendency to set the next following core of the series 28 to 31 in the first remanent state has of course no effect so long as there is a vacant location in the matrix because in that case the next core is already in the first remanent state. The output pulse at 32 is of such polarity that the condenser 33 is charged negatively thereby causing the transistor 34 to conduct heavily. The output current of this transistor through the winding 35 inhibits the setting to the "1" state of the core 36 by the output pulse of the transistor 37 caused by the "write" pulse at 5, through the winding 38. The detailed operation of this part of the circuit is given in co-pending patent application No. 13,799/57. When an item of information is recorded in the last row of the storage matrix there is no output across 32 from the indicator core output windings because although one core of the series 28 to 31 is changed to the second remanent state as indicated above, the tendency to change the next core to the first remanent state now has effect, since the said next core is in the second state and the two simultaneous changes are mutually cancelling in their effect at 32. Consequently the core 36 is set up by the "write" pulse amplified by transistor 37. A detect "full" pulse through the winding 39 causes the core 36 to be reset momentarily and an output is obtained at 40 indicating that the storage matrix is full. This output is also fed to the transistor 37 and the core 36 is reset as explained in the above-mentioned co-pending patent application, so that the "full" indication is not destroyed by a detect "full" pulse.

In a similar manner the core 41 is set up when the storage matrix is emptied though in this case the cores 28 to 31 are changed in succession to the first remanent state. A detect "empty" pulse at 42 resets the core momentarily and an output pulse is obtained at 43 indicating the empty state of the storage matrix.

At the first "read" pulse after the storage matrix is full there is no output across 32. However the core 41 is not set up by the "read" pulse because of the core 36. The latter core is in the state to indicate that the matrix that is full, but is reset by the "read" pulse, amplified by the transistor 45, and applied through the winding 46. When the core 36 is thus reset the output pulse from the core 36 causes the transistor 37 to conduct heavily so that the current from the transistor 37 through the winding 44 inhibits the setting up of the core 41 and a detect "full" pulse is without effect.

Similarly, the core 36 is inhibited from being set up by the first "write" pulse after the storage matrix is empty.

The various transistors used in the arrangement illustrated are positively biased at the base electrodes so that they are normally switched off. When the respective core coupled in the base circuit is changed from state "1" to state "0" a negative pulse is applied to the base electrode sufficient to switch the transistor to a conducting state. Diode valves, where shown, are employed to prevent backward propagation, and may be used elsewhere in the circuit, if necessary, say in the couplings between the stages of the shift registers R1 and R2.

What we claim is:

1. A data storage device comprising a plurality of storage locations, input means for applying signals for storage in said storage locations, control circuits which can be energised to give applied signals access to said storage locations, there being one control circuit for each location, means for energising said circuits in predetermined sequence, indicating means comprising a plurality of switchable devices, there being one switchable device for each storage location coupled to the control circuit for that location and to the control circuit for the next location according to said sequence, the couplings of said switchable devices to the respective control circuits being predetermined to cause each switchable device to change from a first state to a second state in response to energisation of one of the control circuits to which it is coupled and to change from said second state to said first state in response to energisation of the second control circuit to which it is coupled, and means for deriving an indication signal when a change occurs in two switchable devices in response to energisation of one of said control circuits, thereby to indicate an extreme condition of the storage locations.

2. A data storage device comprising a plurality of storage locations, output means for receiving stored signals from said storage locations, control circuits which can be energised to transfer stored signals from said locations to said output means, there being one control circuit for each location, means for energising said circuits in predetermined sequence, indicating means comprising a plurality of switchable devices, there being one switchable device for each storage location coupled to the control circuit for that location and to the control circuit for the next location according to said sequence, the couplings of said switchable devices to the respective control circuits being predetermined to cause each switchable device to change from a first state to a second state in response to energisation of one of the control circuits to which it is coupled and to change from said second to said first state in response to energisation of the second control circuit to which it is coupled, and means for deriving an indication signal when a change occurs in two switchable devices in response to energisation of one of said control circuits, thereby to indicate an extreme condition of the storage locations.

3. A data storage device comprising a plurality of storage locations, input means for applying signals for storage in said storage locations, output means for receiving signals from said storage locations, input control circuits which can be energised to give applied signals access to said storage locations, there being one input control circuit for each location, means for energising said input control circuits in a predetermined sequence, output control circuits which can be energised to transfer stored signals from said locations to said output means, means for energising said output control circuits in a predetermined sequence, indicating means comprising a plurality of switchable devices, there being one switchable device for each storage location coupled to the input control circuit for that location and the input control circuit for the next location according to said first sequence, and coupled also to the output control circuit for that location and to the output control circuit for the next location according to said second predetermined sequence, the couplings of each switchable device to the respective input and output control circuits being predetermined to cause each switchable device to change from a first state to a second state in response to energisation of one of the input control circuits or one of the output control circuits to which it is coupled and to change from said second state to said first state in response to energisation of the other input control circuit or the other output control circuit to which it is coupled, means for deriving an indication signal of one kind when a change occurs in two switchable devices in response to energisation of one of said input control circuits, means for deriving an indication signal of another kind when a change occurs in two switchable devices in response to energisation of one of said output control circuits, and means for inhibiting the derivation of an indication signal of one kind when conditions for giving an indication signal of the other kind have been established.

4. A data storage device according to claim 1, wherein each of said switchable devices comprises a magnetisable core, the couplings from the control circuits to the respective switchable devices including windings on said cores.

5. A data storage device according to claim 2, wherein each of said switchable devices comprising a magnetisable core, the couplings from the control circuits to the respective switchable devices including windings on said cores.

References Cited in the file of this patent

UNITED STATES PATENTS

| | | |
|---|---|---|
| 2,840,801 | Beter | June 24, 1958 |
| 2,844,812 | Aurbach | July 22, 1958 |